United States Patent
Magnusson

[15] 3,662,848
[45] May 16, 1972

[54] HITCHES FOR TRACTOR-MOUNTED IMPLEMENTS
[72] Inventor: Elof Folke Magnusson, Sydvarnsgatan 5 B, 653 44 Karlstad, Sweden
[22] Filed: July 2, 1969
[21] Appl. No.: 838,478

[30] Foreign Application Priority Data
July 2, 1968 Sweden..................................9084/68

[52] U.S. Cl. ..............................180/51, 180/14 R, 280/442
[51] Int. Cl. .........................................................B62d 15/00
[58] Field of Search ...............180/14, 51, 50, 79.2; 280/408, 280/411, 419, 426, 97, 442

[56] References Cited

UNITED STATES PATENTS

| | | | |
|---|---|---|---|
| 1,416,613 | 5/1922 | Colardeau | 280/419 |
| 1,529,630 | 3/1925 | Jonkhoff | 280/419 |
| 3,282,367 | 11/1966 | Mathew et al. | 180/51 |
| 3,450,222 | 6/1969 | Ohlson | 180/51 X |
| 3,529,690 | 9/1970 | Mathew | 180/51 |

*Primary Examiner*—Kenneth H. Betts
*Attorney*—Ralph E. Bucknam, Jesse D. Reingold, Robert R. Strack and Henry A. Marzullo, Jr.

[57] ABSTRACT

This invention relates to a hitch for tractor mounted implements of the self-propelled type having two or four-wheel drives wherein the wheels are non-pivotally connected to the two axles and steering is effected by articulation of the two wheel axle carrying vehicle parts in relation to one another by means of a steering mechanism provided between the vehicle parts. The hitch is mounted for pivotal movement on a vertical shaft carried on one of the vehicle axle carrying wheel parts such that the hitch is pivotally connected to one of the aforesaid vehicle parts. The hitch is coupled to the steering mechanism by means of a transmission which is adapted to swing the hitch approximately equally in opposite directions in relation to the aforesaid vehicle parts.

1 Claim, 10 Drawing Figures 3,662,848
SHEET 1 OF 3
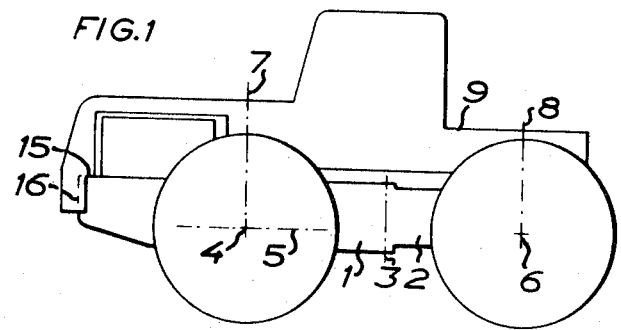
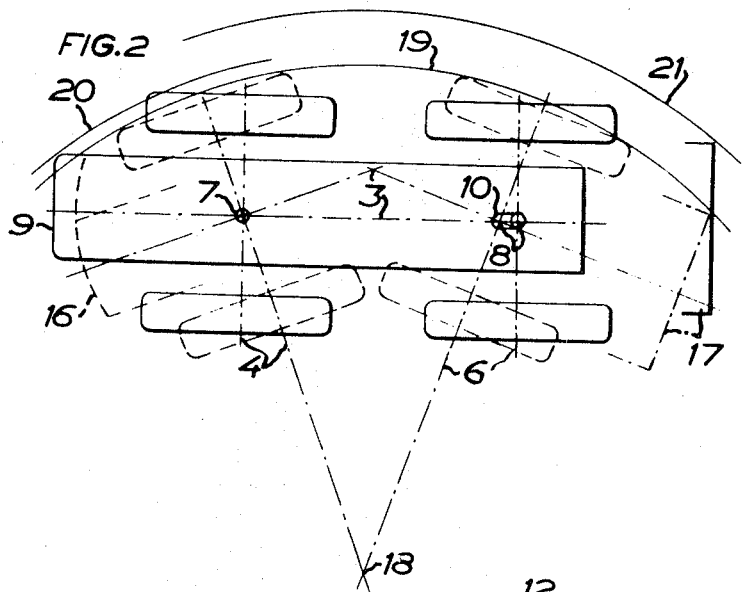
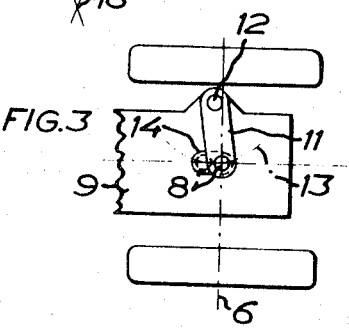

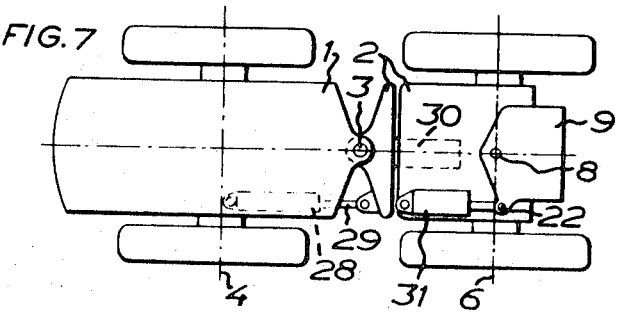
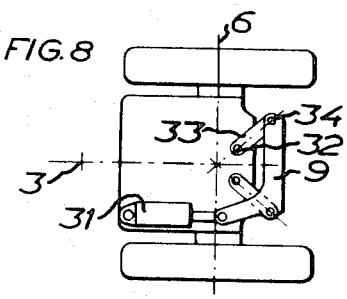
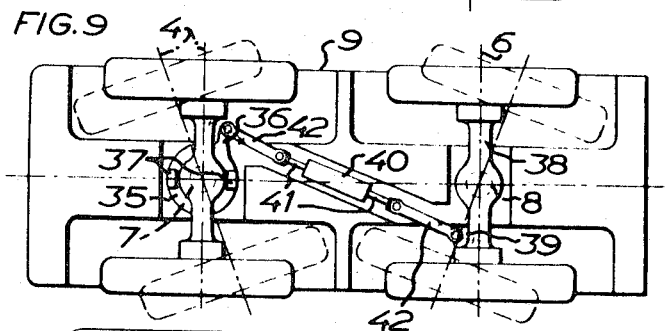
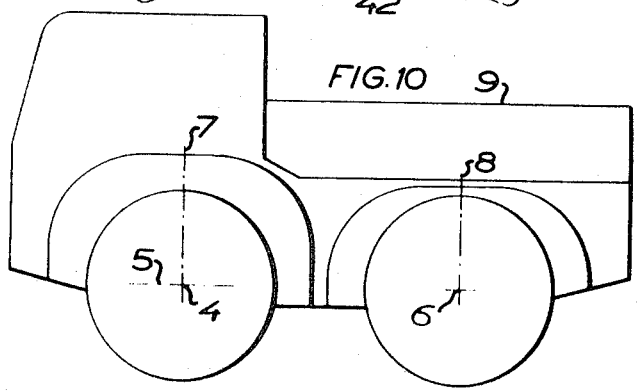

HITCHES FOR TRACTOR-MOUNTED IMPLEMENTS

This invention relates to a hitch for tractor-mounted implements.

Four-wheel drive articulated tractors and like vehicles are particularly well suited for cross-country travel. This is due to the rear wheels following the track of the front wheels and also to the vehicle permitting articulation at standstill. If the vehicle has got stuck, it is thus possible to cause it to effect crawling movements, thereby pulling out of the cavity in which a wheel has buried itself. Said crawling movements make it impossible or at least difficult to use tractor-mounted implements since large and rapid lateral movements are imparted to them.

The present invention has for its object to eliminate this drawback. To this end, the invention relates to a hitch for tractor-mounted implements at such a self-propelled two or four-wheel drive two-axle vehicle of full cross-country mobility, in which the wheels are non-pivotally connected to the two axles and steering is effected by articulation of the two wheel axle carrying vehicle parts in relation to one another by means of a steering mechanism provided between said vehicle parts. Characteristic of the hitch according to the invention is that it is mounted for pivotment on a vertical shaft and thus pivotally connected to at least one of the wheel axle carrying vehicle parts, and that it is coupled to the steering mechanism by means of a transmission which is adapted to swing the hitch approximately equally much in opposite directions in relation to the wheel axle carrying vehicle parts. At the crawling movements the tractor-mounted implement will therefore be kept immovable and not be subjected to any lateral movements.

The invention will now be more fully described with reference to the accompanying drawings which illustrate some embodiments, chosen by way of example, of the hitch mounted on various types of vehicles.

In the drawings:

FIGS. 1–6 show articulated tractors in which the front axle can be swung about a longitudinal axis in relation to the remaining tractor;

FIG. 1 is a side elevational view of a tractor having a large implement hitch carrying a driver's cab;

FIG. 2 is a plan view of said tractor and the rear end of a tractor-mounted implement when the tractor is driven straight ahead or back and in a curve;

FIG. 3 is a plan view of the rear end of a tractor with an alternative embodiment of the hitch;

FIG. 4 is a modified embodiment of the tractor shown in FIG. 2;

FIG. 5 is a plan view of a tractor having a rear implement hitch with an adjustable transmission;

FIG. 6 is a plan view of a tractor having a rear implement hitch the axis of which is located above the drawbar;

FIG. 7 is a plan view of an articulated tractor having the rear end mounted for pivotment about a longitudinal axis, said tractor being equipped with a hydraulically operated implement hitch;

FIG. 8 is a plan view of the rear end of a tractor having an implement hitch mounted on two links which make an angle with one another;

FIGS. 9 and 10 are a bottom plan view and side elevational view, respectively, of a vehicle whose wheel axles can each be swung about one vertical shaft in relation to a large implement hitch carrying a driver's cab.

Figure 4:
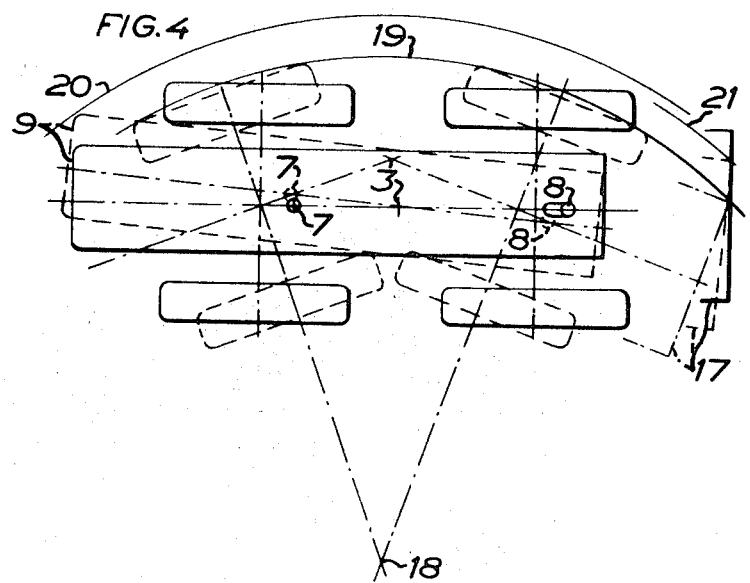

The articulated tractor shown in FIGS. 1 and 2 is of a previously known type and thus comprises a front frame part 1 and a rear frame part 2 which are capable of articulation in relation to one another about the vertical fulcrum 3 of the tractor articulation. The front wheel axle 4 can be swung about a longitudinal axis 5 in relation to the frame part 1, and the tractor is stabilized against overturning in that the rear wheel axle 6 is fixed in respect of the frame part 2.

The new means according to the invention comprises two vertical shafts 7 and 8 secured in the tractor frame parts 1 and 2 directly above the centers of the wheel axles 4 and 6, and the implement hitch 9 which is mounted on the front vertical shaft 7 and embraces the rear vertical shaft 8 by means of an elongated hole 10. To avoid unnecessary manufacturing exactitude the hole 10 preferably has a clearance in the longitudinal direction larger than the mutual distance changes between the shafts 7 and 8, which changes are caused by the steering movements. The clearance shall be small in the transverse direction to avoid hard impacts between the shaft 8 and the implement hitch 9. For reduction of wear the shaft 8 may be equipped with rollers (not shown) or externally flat, sliding bushes. Since, however, planar roller tracks or sliding surfaces are relatively difficult to manufacture, lubricate and protect against impurities they should be replaced by one or a pair of links 11 (as shown in FIG. 3) if the necessary space for such a linkage is available. The link or links 11 are pivotally mounted on the shaft 8 and on a shaft 12 which is fixedly connected with the hitch 9. It is not of any great importance if the shaft 8, instead of rectilinearly with respect to the hitch 9, moves along an arc 13 about the shaft 12, provided that the distance between the shaft 8 and 12 is large compared to the distance changes between the shafts 7 and 8. As shown in FIG. 3, the hitch has a hole 14 which surrounds the shaft 8 so that the latter freely extends therethrough. Therefore, the hole 14 does not require any exact machining.

An alternative connection of the hitch 9 to the vertical shafts 7 and 8 is to mount the hitch on the rear vertical shaft 8 and to have it movable in relation to the front vertical shaft 7. Which alternative one should select depends upon the contact, if any, of the hitch with the other surfaces on the tractor frame parts 1 and 2. In FIGS. 1 and 2 the front end of the hitch 9 is supported by the tractor frame part 1 via a planar horizontal surface 15 and an arcuate vertical surface 16. The hitch can be supported by these surfaces with the interposition of rollers, or can slide against them.

The movements of, and the space required for, the hitch 9 and an implement 17 mounted on the rear end of the tractor, will appear from FIGS. 2 and 4. The rear contours of the implement have been drawn on the assumption that the implement is attached either in a previously known manner to the tractor frame part 2 or to the new implement hitch 9 according to the invention. Upon non-articulation of the tractor frame at the fulcrum 3, the implement in both cases has the full line contours. At maximum articulation of the tractor frame — wheels indicated by dashed lines — the hitch 9 and the implement 17 are insignificantly displaced from the position shown by full lines in FIG. 2, but in the case of a tractor having the vertical shafts 7 and 8 placed behind the wheel axles the said parts are displaced to the position shown by dashed lines in FIG. 4. The dash and dot lines show the implement 17 attached to the tractor frame part 2. The implement 17 is thus moved by the steering mechanism — without being simultaneously driven forward or backward — to an essentially smaller extent when it is carried by the hitch 9, particularly that according to FIG. 2, than when it is carried in a previously known manner by the tractor frame part 2.

The space required when the tractor is driven forward or backward through a narrow curve about the point of intersection 18 of the wheel axles in FIGS. 2 and 4, will appear from the arc 19 for the wheels, the arc 20 for the hitch 9, and the arc 21 for the implement 17. In dash and dot position — when attached to the tractor frame part 2 — the implement travels well inside the arc 21 (in these examples also inside the arc 19 described by the wheels).

Figure 5:
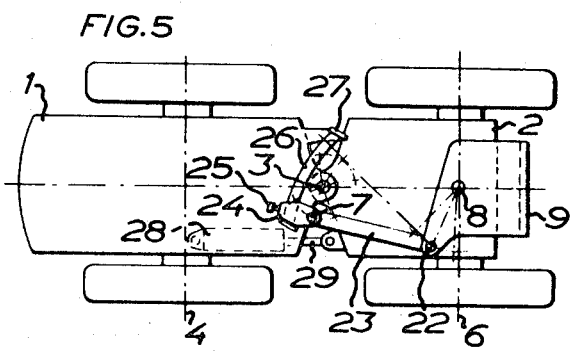

FIG. 5 shows a hitch having an adjustable and reversible transmission on the rear end of an articulated tractor. The rear frame part 2 of the tractor preferably has two journals 8, one directed upwardly and the other directed downwardly. The hitch 9 embraces the upper and lower sides of the frame part 2 and is coupled by means of a shaft 22 and a link 23 to a shaft 7 adjustably secured to the front frame part 1 of the tractor. The shaft 7 is inserted in a movable holder 24 which encloses, and can be tightened by means of a screw 25 or like means to, an arcuate bar 26 having end fastenings 27. The steering movements about the fulcrum 3 of the articulation are brought about by a hydraulic power cylinder 28 having a piston rod 29 (not shown in the earlier Figures). When the shaft holder 24 is moved along the bar 26, the shaft 7 describes an arc of a circle directly over the fulcrum 3 of the tractor articulation. The center of said arc and of the bar 26 is the shaft 22, when the steering mechanism is set for driving straight ahead or back. In this position the hitch 9 thus is not swung by movement of the shaft 7 and the holder 24 along the bar 26. The distance between the shafts 3 and 7 is limited in both directions by the bar end fastenings 27 at approximately half the distance between the shafts 8 and 22. The hitch 9 can therefore be swung in relation to the frame part 2 at most through approximately half as large an angle as the front frame part 1 in the same or the opposite direction. When swung to the maximum possible extent in the same direction as the first frame part 1 the hitch is practically not swung at all in relation to the ground. The hitch 9 in FIG. 5, in which the shaft 7 occupies the illustrated position at the lefthand end of the bar 26, will function approximately in the manner of the hitch in FIG. 2, but by movement of the shaft holder 24 along the bar 26 it can be infinitely varied to be swung for instance in a known manner as much as the frame part 2 — with the shaft 7 directly above the fulcrum 3 of the tractor articulation — or approximately twice as much.

The shaft holder 24 is preferably movable along the bar 26 with the aid of a long screw (not shown) having a crank at one end, or with the aid of a hydraulic cylinder to permit being adjusted without risk also when the tractor stands in articulated position on a slope. The tightening means 25 may, however, be required to eliminate clearance. A considerably cheaper but only stepwise adjustable transmission with more clearance is obtained by substituting for the parts 24–27 a pair of metal sheets placed beneath or above the link 23 and having an arcuate row of holes in which the shaft 7 can be inserted under loose fit.

Figure 6:
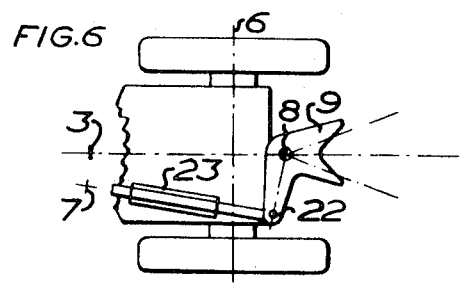

FIG. 6 shows a fork-shaped hitch 9 serving to support an implement coupled in a known manner to the drawbar of a tractor, when said implement is raised from the ground. The shaft 8 of the hitch therefore is located above the drawbar, and the link rod 23 is longer than in FIG. 5, but can have the front end coupled approximately in the manner shown therein. The intermediate portion of the rod 23 is drawn relatively thick for the following reasons. Since the connection of the implement to the drawbar and probably also to the hitch 9 (when incompletely raised) is not very exact, the link rod 23 should permit being lengthened and shortened to eliminate — and in some cases also to provide — oblique positioning of the implement for a longer time, and to limit impacts occurring due to clearance. For the first purpose, the link rod 23 can be divided into three sections with joints of righthand and lefthand thread. For the latter purpose, the intermediate portion should besides be both resilient and shock absorbing (a shock absorber of some known type).

FIG. 7 shows a rather conventional type of articulated tractor. The front wheel axle 4 is fixed in the front frame part 1 and instead the rear wheel axle 6 together with almost the whole rear frame part 2 can be swung about a longitudinal axis 30. This will make it difficult to connect a rearward hitch 9 to the front frame part 1 through a link rod or like means, particularly so if the transmission should be variable and reversible. The difficulty of providing room for a link rod, a pair of steering cables or the like which are drawn past the tractor articulation to a hitch, for example at the front end of the tractor, can arise also for other reasons than the above mentioned tractor design, e.g. when the tractor articulation is flexible also in the vertical sense as is the case when the tractor is steered by means of the tractor rear end. However, it is almost always possible to provide room for hydraulic oil hoses. Therefore the hitch 9 in FIG. 7 is controlled by a hydraulic power cylinder 31 which is connected in series with the conventional control cylinder 28 of the tractor by means of a hose connecting the bottom ends of the cylinders. Lines from the pump through the control valve are then connected to the cylinder ends at the piston rods. Thus, oil leakage at the piston rods will not displace the pistons in relation to one another but some valve is still required, through which the oil quantity between the pistons can be adjusted from time to time.

The transmission shown in FIG. 7 is a fixed one, but can also be made slightly variable. The cylinder 31 of the hitch is shown to have a lever arm equally long as the control cylinder 28 of the tractor, but has twice as large a piston area and thus half the stroke length. The cylinder 31 can be still larger, in which case the distance between the shafts 8 and 22 can be smaller. As a consequence, a space will be obtained inside the rear wheel so that the axle distance, if necessary, can be increased for changing the transmission. In such a case, the shaft 22 should be movable approximately as the shaft 5 in FIG. 7, but never close to the shaft 8.

A similar change of the transmission is possible through adjustment of valves if the cylinder 31 is connected in parallel mechanically, and at one valve position also hydraulically, with a preferably somewhat larger cylinder. When both cylinders are connected parallel with one another and in series with the control cylinder the hitch 9 will be swung by the least amount in relation to the rear part 2 of the tractor, but by a greater amount if merely the larger cylinder is connected, and by the maximum amount if merely the smallest cylinder 31 is connected. A still further transmission stage might be obtained by connecting the cylinders in such a way that they counteract one another.

In the tractor shown in FIG. 8 it is assumed that the desired room for the shaft 8 (directly above and beneath the wheel axle 6) is not accessible. The hitch 9 can, however, be pivoted almost as if it were mounted on a shaft positioned there. This is realized by the provision of a pair of shafts 32 as close to the desired shaft position as possible, and of a pair of links 33 mounted on the shafts 32 and connected to a pair of shafts 34 in the hitch 9. The links 33 are as long as the space permits, and when the hitch 9 is in its intermediate position they point approximately to the desired shaft location. Besides, they make a large, preferably right angle with one another. The power cylinder 31 is drawn in FIG. 8 in the same manner as in FIG. 7, but in both cases it can have another location for example behind the wheel axle 6 and approximately parallel with it, if there is sufficient room.

Other possibilities of mounting a hitch for pivotment about an inaccessible, desired shaft location on a tractor part is to provide the tractor part in question with arcuate bars which should cover a greater angle than the surfaces 15 and 16 in FIG. 2, and to equip the hitch with rollers guided by the bars, or vice versa.

FIGS. 9 and 10 show a four-wheel drive vehicle which when steered moves its wheels almost in the manner of an articulated vehicle and is reckoned to have approximately the same ability of travelling over slippery and soft ground. The difference in steering movements only is that the distance between the centers of the front and rear axles and thus between the vertical shafts 7 and 8 placed above the wheel axles is not altered. The hitch 9 which constitutes the largest part of the vehicle and contains both the vehicle engine and cab, need not therefore be made displaceable in relation to any of the shafts 7 and 8. There is no need for a fulcrum, and there is not either required any exact parallelism between the shafts 7 and 8.

In FIG. 9 a metal sheet protecting the tractor underside and some low-level parts of the tractor frame carrying the hitch 9 have been removed to show int.al. the steering mechanism. The front vertical shaft 7 is fixedly connected to a plate 35 which is designed to form int.al. a steering arm 36 and two bearings 37 for the shaft 5 indicated in FIG. 10 and about which the front axle 4 can turn. The rear vertical shaft 8 is directly connected to the rear axle housing 38 on which is provided a steering link bearing 39. A hydraulic control cylinder 40 is attached to the hitch 9 and has a piston rod 41 which extends through both cylinder ends and is connected by means of links 42 to the arm 36 and the bearing 39.

Instead of the single control cylinder 40 shown it is possible to use two separate cylinders or pairs of cylinders. In such a case the front and rear axles can, if necessary, be turned differently and also in the same direction so that the vehicle is moved in parallel obliquely forwardly and rearwardly.

The invention is not restricted to that described above and shown in the drawings but permits of being modified within the scope of the appended claims.

What I claim and desire to secure by Letters Patent is:

1. A hitch for tractor mounted implements of the self-propelled type having two or four-wheel drives comprising two vehicle parts each carrying an axle, wheels non-pivotally connected to the two axles, pivotal means pivotally connecting said two vehicle parts, a steering mechanism operatively connected between said two vehicle parts whereby steering is effected by articulation of the two vehicle parts relative to one another about said pivotal means, one of said vehicle parts having a vertically mounted shaft, one of said vehicle parts being a platform means mounted for pivotal movement on said vertical shaft, and transmission means between said platform means and said steering mechanism operable to pivot the platform means in opposite direction relative to the pivotal movement of the two vehicle parts, said transmission means comprising a link mechanism operatively connecting said platform means and the other of said vehicle parts, said link mechanism including an arcuate bar means adjustable receiving a link bar operable to adjust the relative pivotal movement of the platform means relative to the other vehicle part whereby the platform means can be swung in relation to the other vehicle part through up to one-half as large an angle in either the same or opposite direction.

* * * * *